US011055570B2

(12) United States Patent
Ruan (10) Patent No.: US 11,055,570 B2
(45) Date of Patent: Jul. 6, 2021

(54) IMAGE PROCESSING METHOD AND APPARATUS FOR IMPLEMENTING IMAGE RECOGNITION, AND ELECTRONIC DEVICE

(71) Applicant: TENCENT TECHNOLOGY (SHENZHEN) COMPANY LIMITED, Shenzhen (CN)

(72) Inventor: Hang Ruan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 137 days.

(21) Appl. No.: 16/594,330

(22) Filed: Oct. 7, 2019

(65) Prior Publication Data

US 2020/0034662 A1  Jan. 30, 2020

Related U.S. Application Data

(63) Continuation of application No. PCT/CN2018/111957, filed on Oct. 25, 2018.

(30) Foreign Application Priority Data

Oct. 25, 2017 (CN) .......................... 201711008168.7

(51) Int. Cl.
*G06K 9/62* (2006.01)
*G06K 9/00* (2006.01)
*G06K 9/46* (2006.01)

(52) U.S. Cl.
CPC ....... *G06K 9/6256* (2013.01); *G06K 9/00973* (2013.01); *G06K 9/4642* (2013.01); *G06K 9/6215* (2013.01)

(58) Field of Classification Search
CPC ............. G06K 9/6256; G06K 9/00973; G06K 9/4642; G06K 9/6215

(Continued)

(56) References Cited

U.S. PATENT DOCUMENTS

2019/0130215 A1* 5/2019 Kaestle ................ G06K 9/6256
2020/0272921 A1* 8/2020 Thomas ................. G06N 20/00

FOREIGN PATENT DOCUMENTS

CN          1482571          3/2004
CN        104298975          1/2015
(Continued)

OTHER PUBLICATIONS

International Search Report dated Jan. 9, 2019 in PCT/CN2018/111957 filed Oct. 25, 2018. (Wth English Translation).
(Continued)

*Primary Examiner* — Ayodeji O Ayotunde
(74) *Attorney, Agent, or Firm* — Oblon, McClelland, Maier & Neustadt, L.L.P.

(57) ABSTRACT

An image processing method for implementing image recognition using a distributed computing framework is provided. In the method, an image sample data set is obtained by processing circuitry of an image processing apparatus. The image sample data set includes a plurality of image samples. The image sample data set is divided by the processing circuitry into image sample sub-blocks according to a quantity of the image samples in the image sample data set and a quantity of computing nodes of the distributed computing framework. The image sample sub-blocks are distributed by the processing circuitry to the computing nodes. Each of the computing nodes performs image recognition sample training based on the one of the image sample sub-blocks distributed to the respective computing node and obtains a training result corresponding to each image sample in the one of the image sample sub-blocks.

20 Claims, 8 Drawing Sheets

(58) Field of Classification Search
USPC .......................................................... 382/159
See application file for complete search history.

(56) References Cited

FOREIGN PATENT DOCUMENTS

| CN | 106208012 | 2/2017 |
| CN | 106599798 | 4/2017 |
| CN | 106874971 | 6/2017 |

OTHER PUBLICATIONS

Written Opinion dated Jan. 9, 2019 in PCT/CN2018/111957 filed Oct. 25, 2018.

\* cited by examiner

IMAGE PROCESSING METHOD AND APPARATUS FOR IMPLEMENTING IMAGE RECOGNITION, AND ELECTRONIC DEVICE

RELATED APPLICATION

This application is a continuation of International Application No. PCT/CN2018/111957, filed on Oct. 25, 2018, which claims priority to Chinese Patent Application No. 201711008168.7, filed on Oct. 25, 2017. The entire disclosures of the prior applications are hereby incorporated by reference in their entirety.

FIELD OF THE TECHNOLOGY

The present disclosure relates to the field of big data processing technologies.

BACKGROUND OF THE PRESENT DISCLOSURE

Image recognition is an important application of computer vision and pattern recognition, and has great application prospects in aspects such as security systems and human-computer interaction.

In currently popular image recognition solutions, a main technical focus is to improve a recognition rate and recognition efficiency. Feature point-based image recognition algorithms, for example, feature recognition algorithms such as principal component analysis (PCA), linear discriminant analysis (LDA), and local binary pattern (LBP) or local texture feature analysis, and neural network-based algorithms for recognition all improve an image recognition rate to some extent. Moreover, to improve image recognition efficiency, most solutions improve image recognition architecture, including an image recognition solution based on a cloud computing framework, an image recognition solution based on a parallel framework, and an image recognition solution based on a mobile cloud framework.

Feature-based or neural network-based algorithms may usually achieve a recognition rate of more than 99% on the premise of sufficient samples. However, in a case that there is not a large amount of sample data or a sample support scale is not large enough, an accurate recognition rate cannot be achieved. While the foregoing technical solutions improve accuracy and a response time of image recognition, improving training efficiency of image samples in basic steps of image recognition is often neglected. Particularly, in a current big data background, because all image samples need to be trained sequentially, training efficiency is low, and training of massive data consumes more time.

SUMMARY

To resolve a problem that image sample training efficiency in basic steps of image recognition is low in the related technology, the present disclosure provides an image processing method, image processing apparatus, and an electronic device for implementing image recognition, for improving image sample training efficiency.

According to an aspect, the present disclosure provides an image processing method for implementing image recognition using a distributed computing framework. In the method, an image sample data set is obtained by processing circuitry of an image processing apparatus. The image sample data set includes a plurality of image samples. The image sample data set is divided by the processing circuitry into image sample sub-blocks according to a quantity of the image samples in the image sample data set and a quantity of computing nodes of the distributed computing framework. The image sample sub-blocks are distributed by the processing circuitry to the computing nodes. Each of the computing nodes performs image recognition sample training based on the one of the image sample sub-blocks distributed to the respective computing node and obtains a training result corresponding to each image sample in the one of the image sample sub-blocks.

In an aspect, the computing nodes perform the image recognition sample training and the obtaining in parallel.

In an aspect, a newly-added image sample is obtained by the processing circuitry. The newly-added image sample is distributed by the processing circuitry to one of the computing nodes that performs another image recognition sample training for the image samples distributed to the one of the computing nodes to obtain a new training result of each of the image samples distributed to the one of the computing nodes.

In an aspect, in a case that the quantity of the image samples of the image sample data set is N, and the quantity of the computing nodes is n, a newly-added $(N+a)^{th}$ sample image is distributed to an $((N+a) \% n)^{th}$ computing node of the computing nodes.

In an aspect, a to-be-tested image is obtained by the processing circuitry. The to-be-tested image is input by the processing circuitry to the computing nodes of the distributed computing framework. The computing nodes perform recognition on the to-be-tested image according to the training results of the image samples distributed to the respective computing nodes, to obtain recognition results of the to-be-tested image on the respective computing nodes. An image recognition result is determined based on the recognition results of the to-be-tested image on the respective computing nodes.

In an aspect, each of the computing nodes performs a first training according to a two-dimensional principal component analysis algorithm to obtain a primary feature space of the respective computing node and a primary feature vector corresponding to each image sample in the respective computing node in the primary feature space. Further, each of the computing nodes uses the primary feature vector as sample input of a linear discriminant analysis algorithm, and performs a second training to obtain a secondary feature space of the respective computing node and a secondary feature vector corresponding to each image sample in the respective computing node in the secondary feature space.

In an aspect, each of the computing nodes projects the to-be-tested image to the primary feature space of the respective computing node, to obtain a primary test feature vector corresponding to the to-be-tested image. Each of the computing nodes projects the primary test feature vector to the secondary feature space of the respective computing node, to obtain a secondary test feature vector corresponding to the to-be-tested image. Further, each of the computing nodes calculates a similarity between the secondary test feature vector and the secondary feature vector of each image distributed to the respective computing node, to determine the image sample having a highest similarity.

In an aspect, an image sample of the determined image samples having a highest occurrence frequency is determined, from the image samples that each have a highest similarity as determined by the respective computing nodes, as a recognition result of the to-be-tested image.

In an aspect, a Euclidean distance is calculated between the secondary test feature vector and the secondary feature vector of each image sample distributed to the respective computing node. The image sample of which the Euclidean distance is the shortest is determined as the image sample most similar to the to-be-tested image.

In addition, the present disclosure further provides a non-transitory computer-readable storage medium, the computer-readable storage medium storing instructions which when executed by a processor cause the processor to perform any of the foregoing image processing methods for implementing image recognition.

The technical solutions provided by the embodiments of the present disclosure may include the following beneficial effects:

In the exemplary embodiments of the present disclosure, based on a distributed computing framework, respective computing nodes of the distributed computing framework perform block training of all image samples. Training tasks are balanced and loaded to the respective computing nodes, and sample training is implemented in parallel by the respective computing nodes, so that training efficiency is greatly improved, and time consumed by sample training is reduced. The present disclosure is applicable to sample training in an image recognition process in the current big data background.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DESCRIPTION OF EMBODIMENTS

Exemplary embodiments are described in detail herein, and examples of the exemplary embodiments are shown in the accompanying drawings. In a case that the following descriptions relate to the accompanying drawings, unless indicated otherwise, the same numbers in different accompanying drawings represent same or similar elements. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
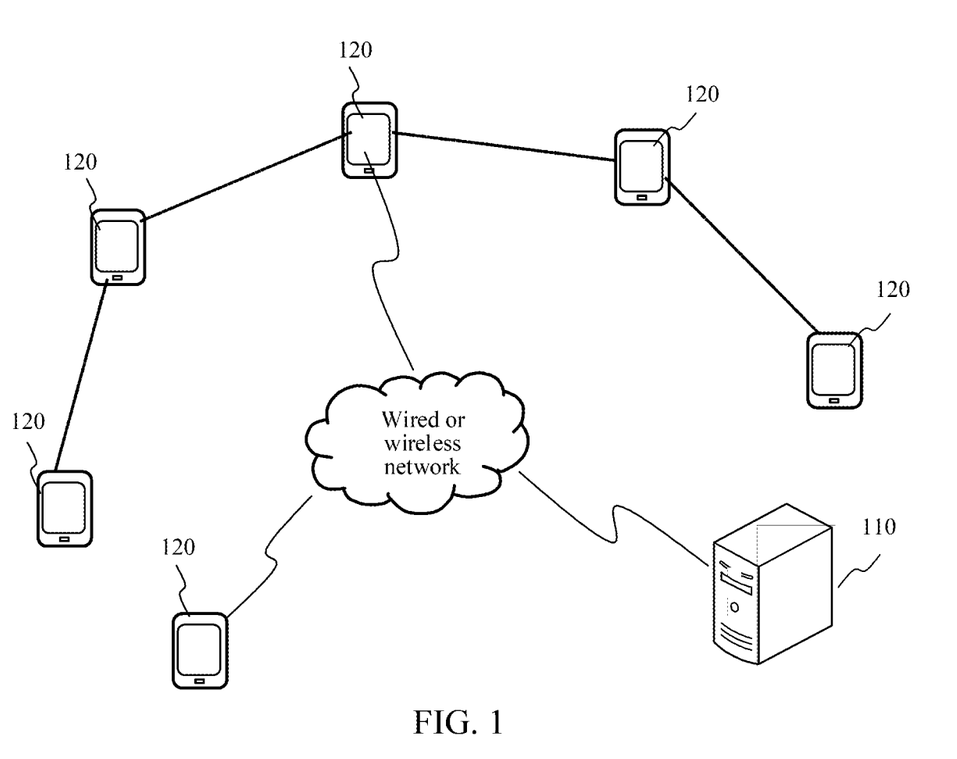
FIG. 1 is a schematic diagram of an exemplary implementation environment according to the present disclosure.

FIG. 1 is a schematic diagram of an exemplary implementation environment according to the present disclosure. The implementation environment includes: a server 110 and an intelligent device 120. The intelligent device 120 may be a mobile terminal (e.g., a smartphone) or an intelligent household appliance (e.g., an intelligent camera) having an image capturing function.

A manner of association between the server 110 and the intelligent device 120 includes a network association manner and/or protocol of hardware, and an association manner of a data exchange therebetween. The intelligent device 120 has an image capturing function, and the server 110 receives an image sample captured by the intelligent device 120. The server 110 may be based on the Linux system, stores an original image sample data set captured by the intelligent device 120 through Hadoop (which is a software framework capable of performing distributed processing on a large amount of data), and implements distributed training of the image sample data set and searching and recognition on a to-be-tested image by running a program.

Figure 2:
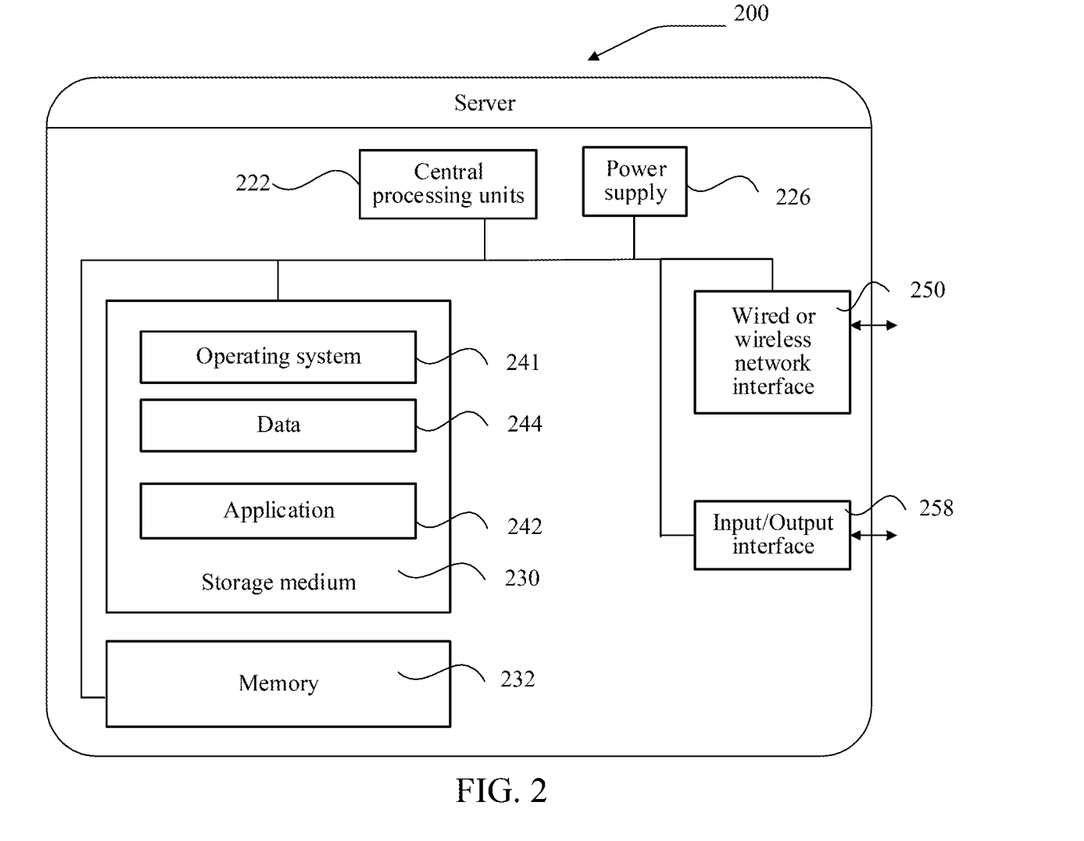
FIG. 2 is a block diagram of a server according to an exemplary embodiment.

Referring to FIG. 2, FIG. 2 is a schematic structural diagram of a server according to an embodiment of the present disclosure. The server 200 may vary greatly due to different configurations or performance, and may include processing circuitry such as one or more central processing units (CPU) 222 (e.g., one or more processors) and a memory 232, and one or more storage media 230 (e.g., one or more mass storage devices) that store applications 242 or data 244. The memory 232 and the storage medium 230 may be transient or persistent storages. The program stored in the storage medium 230 may include one or more modules, and each module may include a series of instructions and operations for the server 200. Still further, the CPU 222 may be configured to communicate with the storage medium 230, and perform, on the server 200, a series of instructions and operations in the storage medium 230. The server 200 may further include one or more power supplies 226, one or more wired or wireless network interfaces 250, one or more input/output interfaces 258, and/or one or more operating systems 241, for example, Windows Server®, Mac OS®, Unix®, Linux®, or FreeBSD®. The steps performed by the server in the embodiments shown in FIG. 3 to FIG. 5 and FIG. 7 below may be based on the server structure shown in FIG. 2.

A person of ordinary skill in the art may understand that all or some of the steps of the embodiments below may be implemented by hardware or a program instructing related hardware. The program may be stored in a computer readable storage medium (e.g., a non-transitory computer-readable storage medium). The storage medium may include: a read-only memory, a magnetic disk, or an optical disc.

Figure 3:
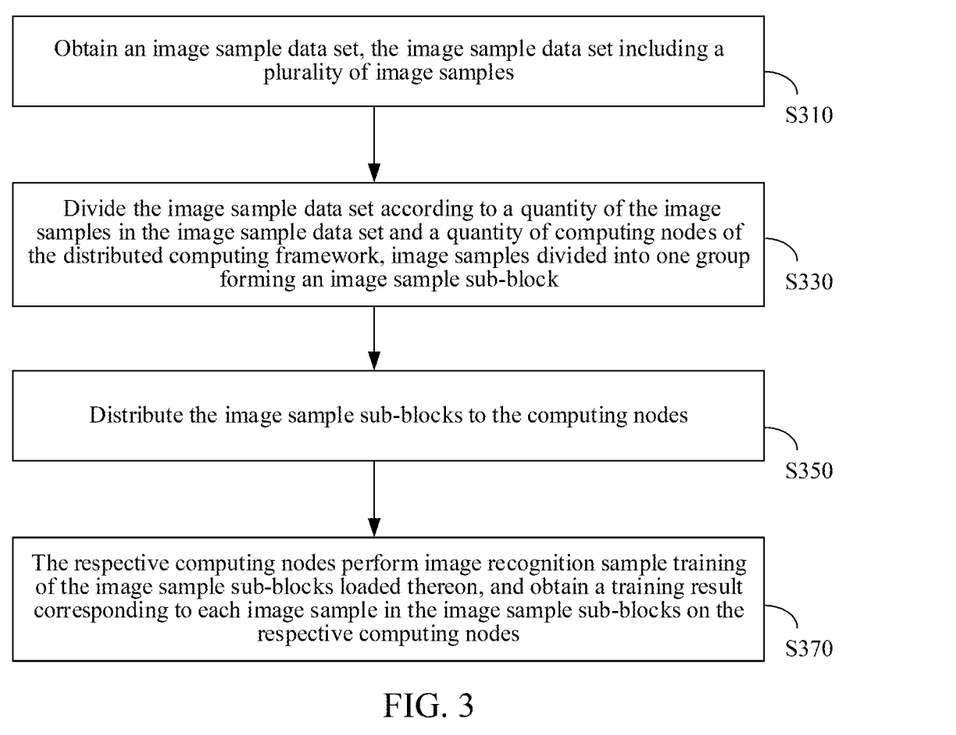
FIG. 3 is a flowchart of an image processing method for implementing image recognition according to an exemplary embodiment.

FIG. 3 is a flowchart of an image processing method for implementing image recognition according to an exemplary embodiment. An application scope and an execution body of the image processing method for implementing image recognition are described. For example, the method is applied to the server 110 in the implementation environment shown in FIG. 1. The server 110 performs the image processing method for implementing image recognition by using, for example, a MapReduce distributed computing framework. As shown in FIG. 3, the method may be performed by the server 110 and may include the following steps.

In step 310, an image sample data set is obtained. The image sample data set includes a plurality of image samples.

It is to be noted that facial recognition is a main application of image recognition. Therefore, exemplary embodiments of the present disclosure are described by using facial recognition as an example. Image recognition of another type may be performed by referring to face image recognition.

Specifically, an obtained image sample may be a face image sample. For example, face image samples of 20 persons may be obtained, and each person may have 100 images, so that the image sample data set may include 20×100 image samples. The image sample data set may be captured by the intelligent device 120 in advance and stored in the storage medium 230 of the server 110. The server 110 may first perform gray-leveling on the image samples captured by the intelligent device 120. That is, each image sample in the image sample data set may be a gray level image.

In step 330, the image sample data set is divided according to a quantity of the image samples in the image sample data set and a quantity of computing nodes of the distributed computing framework, image samples divided into one group forming an image sample sub-block.

Assuming that a quantity of computing nodes of the distributed computing framework is 5, and a quantity of the image samples in the image sample data set is 20×100, 2000 image samples may be divided into 5 sub-blocks, each sub-block includes 400 image samples, and the respective sub-blocks are independent of each other. In other words, all the image samples are divided into several sample sets, each sample set includes a plurality of image samples, and quantities of image samples in the respective sample sets are approximately the same.

In step 350, the image sample sub-blocks are distributed to the computing nodes.

For example, after an image sample data set including 2000 image samples is divided into 5 image sample sub-blocks, the 5 image sample sub-blocks are respectively distributed to 5 computing nodes. That is, each computing node may have one distributed image sample sub-block.

In step 370, the respective computing nodes perform image recognition sample training of the image sample sub-blocks loaded thereon, and obtain a training result corresponding to each image sample in the image sample sub-blocks on the respective computing nodes.

To further improve training efficiency, the respective computing nodes may perform in parallel image recognition sample training of the image sample sub-blocks loaded thereon, and obtain the training results corresponding to the respective image samples in the image sample sub-blocks on the respective computing nodes.

For example, in a case that there are 2000 image samples, in the related technology, one computing node performs training of the 2000 image samples, and training efficiency is relatively low. In this exemplary embodiment of the present disclosure, a distributed computing framework is used, and assuming that there are 5 computing nodes, an image sample sub-block distributed to each computing node includes 400 image samples, and the 5 computing nodes concurrently perform training of image sample sub-blocks distributed to them. Therefore, each computing node only needs to perform training of 400 image samples, so that training efficiency is improved. The respective computing nodes independently perform training of the image sample sub-blocks distributed thereto, and obtain training results of respective image samples in the image sample sub-blocks thereon. That is, each computing node may obtain training results of 400 image samples.

It is to be noted that training of image samples in a related image recognition process is that one computing node performs full training of all image samples. In a case of a relatively large data mount, training efficiency is low, and more time is consumed. In this exemplary embodiment of the present disclosure, after the respective image sample sub-blocks are distributed to the respective computing nodes, the respective computing nodes perform in parallel training of image sample sub-blocks distributed thereto. Training tasks are balanced and loaded to the respective computing nodes, and sample training is implemented in parallel by the respective computing nodes, so that training efficiency is greatly improved.

Figure 4:
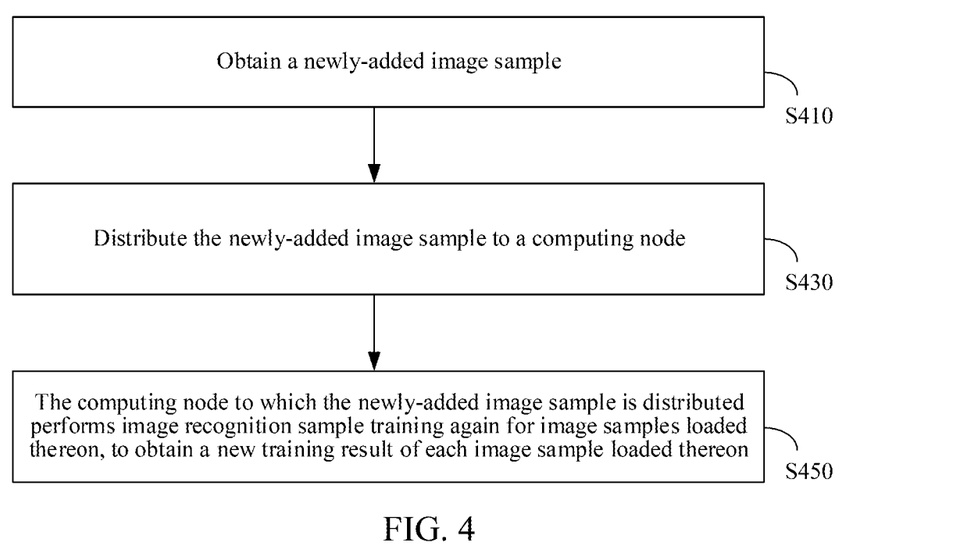
FIG. 4 is a flowchart of an exemplary image processing method for implementing image recognition based on the embodiment corresponding to FIG. 3.

In a current massive data background, using algorithms, such as Linear Discriminant Analysis (LDA), Principal Component Analysis (PCA), and Local Binary Pattern (LBP) or local texture feature analysis, has excess time overheads, and cannot satisfy enormous user requirements. As picture quality is increasingly high, although recognition accuracy is high, because complexity of a picture is high and a recognition rate of a system is positively correlated to a data amount of a sample database, during recognition in a large quantity of samples, throughput of the system is extremely low, and directly performing centralized training of data samples consumes more time and space overheads. In the foregoing exemplary embodiment of the present disclosure, based on a distributed computing framework, block training of all image samples is performed in parallel by respective computing nodes of the distributed computing framework, so that consumed time of training is reduced. This is suitable for sample training during an image recognition process in a current big data background Optionally, as shown in FIG. 4, after the foregoing step 370, the method provided in this exemplary embodiment of the present disclosure may further include the following steps.

In step 410, a newly-added image sample is obtained.

It is to be noted that a newly-added image sample means that there is an image sample that is newly added and that needs to be trained. The newly-added image sample may be a gray level image.

In step 430, the newly-added image sample is distributed to the computing node.

Step 430 of distributing the newly-added image sample to the computing node specifically includes, for example, distributing, in a case that the quantity of the image samples of the image sample data set is N, and the quantity of the computing nodes is n, a newly-added $(N+a)^{th}$ sample image to an $((N+a) \% n)^{th}$ computing node.

The image sample data set is original image samples, and it is assumed that a quantity of original image samples is N, a quantity of computing nodes is 5, and the newly-added image sample is an $(N+1)^{th}$ input sample. The newly-added image sample may be inputted to a $((N+1) \%5)^{th}$ computing node by solving N+1 modulo 5, that is, (N+1) %5.

In a case that there are two newly-added image samples, that is, there are $(N+1)^{th}$ and $(N+2)^{th}$ image samples, the newly-added $(N+1)^{th}$ image sample is input to a ((N+1)

%5)$^{th}$ computing node, the newly-added (N+2)$^{th}$ image sample is input to a ((N+2) %5)$^{th}$ computing node, and so on.

In step 450, the computing node to which the newly-added image sample is distributed performs image recognition sample training again for the image samples loaded thereon, to obtain a new training result of each image sample loaded thereon.

Specifically, only in a case of existence of a newly-added image sample, the computing node trains the image samples loaded thereon again, and other computing nodes without a newly-added image sample do not to perform training, so that an objective of incremental training is achieved through local retraining. In a case of existence of an (N+1)$^{th}$ image sample, local retraining of only a ((N+1) %5)$^{th}$ computing node is performed, and samples on the other four computing nodes do not need to be retained. New training results of the respective training results are obtained through retraining of the image sample loaded on the ((N+1) %5)$^{th}$ computing node.

It is to be noted that training of image samples in a related image recognition process is that one full data training needs to be performed each time. In a case of addition of a new sample, full training of all pieces of sample data needs to be performed. Because support of a large amount of sample data is needed to ensure accuracy of image recognition, time overheads of each training process are large. A current image recognition method avoids the disadvantage of large time overheads by performing training once and permanently using it. However, as the big data comes, data changes greatly, and in a case that all the image samples are retrained each time, it is conceivable retraining of massive data is a bottleneck of the entire system.

Moreover, in the exemplary embodiment of the present disclosure, the distributed computing framework is used, only a computing node to which an image sample is newly added performs retraining, and other nodes do not need to perform training again. An objective of incremental training is achieved through local retraining, so that time overheads of sample training are reduced.

Figure 5:
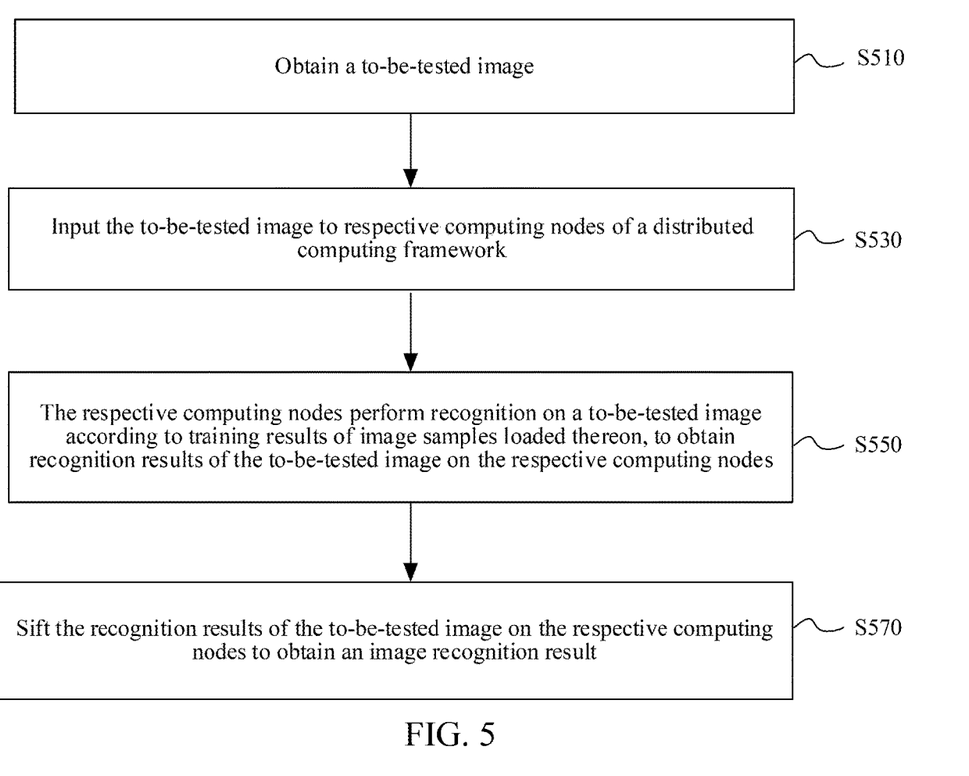
FIG. 5 is a flowchart of another exemplary image processing method for implementing image recognition based on the embodiment corresponding to FIG. 3.

Optionally, as shown in FIG. 5, after the foregoing step 370, the method provided in this exemplary embodiment of the present disclosure may further include the following steps.

In step 510, a to-be-tested image is obtained.

In a related image recognition manner, a to-be-tested image is compared with all image samples one by one to find by searching a most similar image sample as a recognition result of the to-be-tested image. This exemplary embodiment of the present disclosure is different from a related image searching recognition manner, the present disclosure is, for example, based on a distributed computing framework. The respective computing nodes perform in parallel recognition on the to-be-tested image, to select an optimal result from recognition results of the respective computing nodes, that is, implementing global optimality from local optimality.

In step 530, the to-be-tested image is input to the respective computing nodes of the distributed computing framework.

In step 550, the respective computing nodes perform recognition on the to-be-tested image according to the training results of the image samples loaded thereon, to obtain recognition results of the to-be-tested image on the respective computing nodes.

Specifically, the to-be-tested image is input to the respective computing nodes of the distributed computing framework separately. The respective computing nodes compare in parallel the training results of the respective image samples of the image sample sub-blocks loaded thereon with the to-be-tested image, and the respective computing nodes all output their respective recognition results. For example, assuming that there are 5 computing nodes, and an image sample sub-block of each computing node includes 400 image samples, each computing node performs recognition on the to-be-tested image according to training results of the 400 image samples, to obtain a recognition result, so that 5 recognition results of the 5 computing nodes may be obtained.

In step 570, the recognition results of the to-be-tested image on the respective computing nodes are sifted to obtain an image recognition result.

Specifically, the 5 recognition results outputted by the 5 computing nodes are compared to sift an optimal recognition result from the 5 recognition results. For example, an image sample most similar to the to-be-tested image is selected from the 5 recognition results as an optimal recognition result of the to-be-tested image.

Step 370 specifically includes, for example, the following sub-steps.

Sub-step 1: Each computing node trains the image samples loaded thereon by using a two-dimensional principal component analysis algorithm to obtain a primary feature space of the computing node and a primary feature vector corresponding to each image sample in the computing node in the primary feature space.

Two-dimensional principal component analysis (2DPCA) is a common data analysis method. 2DPCA obtains a projection manner with a maximum sample variance by calculating a covariance matrix, that is, obtains a corresponding projection space, completes linear transformation on original data, is used to extract main components of data researches, and is often used in dimensionality reduction of data. Linear discriminant analysis (LDA) is a common linear discriminant analysis method in related pattern recognition, and a main function is first constructing two matrices to respectively represent an inter-class distance and an intra-class distance, and obtaining points at which a partial derivative is an extreme value, to make features of a same class closer and features of different classes farther after sample projection.

Figure 6:
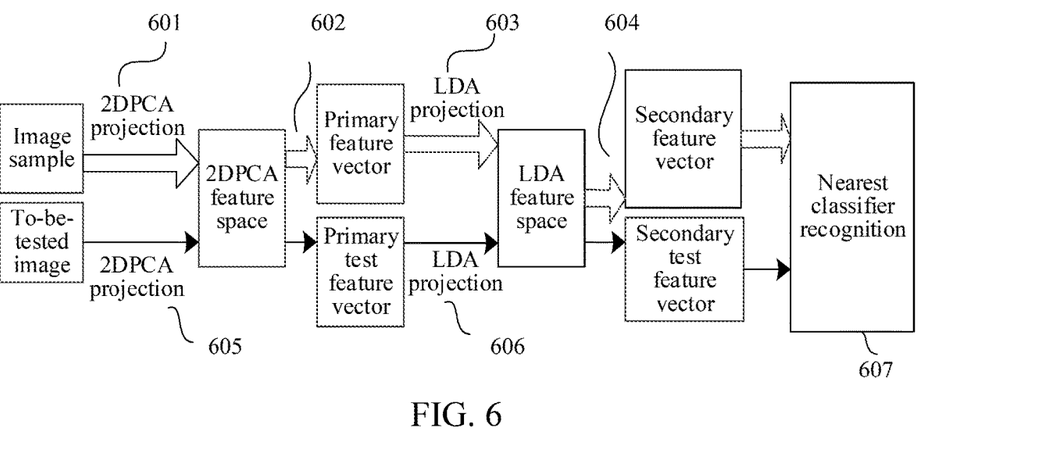
FIG. 6 is a schematic diagram of a principle of performing image processing by combining 2DPCA and LDA algorithms according to an exemplary embodiment.

It is to be noted that the respective computing nodes implement image sample training by combining the 2DPCA algorithm and the LDA algorithm. The 2DPCA algorithm is used to extract main feature components, and the extracted feature vectors are used as input data of the LDA algorithm to perform feature extraction and mapping of inter-class hash matrices. The 2DPCA and LDA algorithms are combined, so that during image sample training, features of images of a same class are concentrated, and a volume of data is small. Features of images of different classes are greatly distinguished from each other, so that accuracy of image recognition is higher, and few fuzzy recognition results appear.

The 2DPCA uses a two-dimensional matrix to represent an image, and an objective of the 2DPCA is seeking for an optimal projection space, that is, a primary feature space (which is a 2DPCA feature space). As shown in FIG. 6, each computing node uses a matrix operation function of open source computer vision (Open CV), uses each image sample (in a form of a two-dimensional matrix) in an image sample sub-block loaded thereon as input of the 2DPCA algorithm, and obtains by calculation a 2DPCA feature space (which is represented by U). Refer to process 601. Subsequently, the computing node projects each image sample (which is represented by $X_i$) loaded thereon to the 2DPCA feature space, and obtains by calculation a primary feature vector (which is represented by Yi, where Yi=Xi×U) corresponding to each image sample. Refer to process 602.

Sub-step 2: Use the primary feature vector as sample input of a linear discriminant analysis algorithm, and perform training to obtain a secondary feature space of the computing node and a secondary feature vector corresponding to each image sample in the computing node in the secondary feature space.

Specifically, each computing node uses a primary feature vector corresponding to each image sample loaded thereon as input of an LDA algorithm to obtain by calculation a secondary feature space (which is an LDA feature space, and is represented by W). Refer to process 603. In addition, computing node projects the primary feature vector (which is represented by Yi) to the LDA feature space, to obtain by calculation a secondary feature vector (which is represented by Ti, where Ti=Yi×W) corresponding to each image sample. Refer to process 604.

Therefore, each computing node has a 2DPCA feature space and an LDA feature space. Assuming that there are 5 computing nodes, there are 5 feature space pairs (2DPCA feature spaces and LDA feature spaces). Each image sample in each computing node has a corresponding secondary feature vector.

Figure 7:
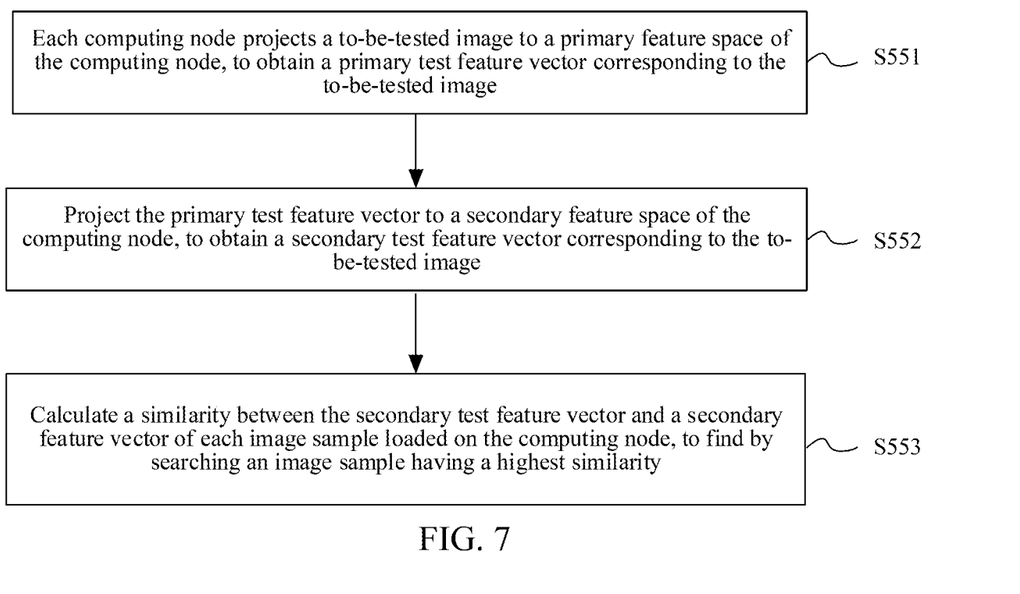
FIG. 7 is an exemplary detailed flowchart of step 550 in the embodiment corresponding to FIG. 5.

Further, as shown in FIG. 7, step 550 specifically includes, for example, the following steps.

In step 551, each computing node projects the to-be-tested image to a primary feature space of the computing node, to obtain a primary test feature vector corresponding to the to-be-tested image.

Specifically, for a specific computing node, a primary feature space of the computing node may be obtained by training through the foregoing step 371 and through the 2DPCA algorithm by using an image sample loaded thereon as input. The respective computing nodes project in parallel the to-be-tested image (which is represented by A) primary feature spaces (which are represented by U) thereof, to obtain by calculation primary test feature vectors (which are represented by B, where B=A×U). Refer to process 605.

In step 552, the primary test feature vector is projected to a secondary feature space of the computing node, to obtain a secondary test feature vector corresponding to the to-be-tested image.

Specifically, for a specific computing node, a secondary feature space of the computing node may be obtained by training through the foregoing step 372 and through the LDA algorithm by using a primary feature vector corresponding to each image sample loaded thereon as input. The respective computing nodes project in parallel the primary test feature vectors of the to-be-tested image respectively obtained by them to secondary feature spaces thereof, obtain by calculation secondary test feature vectors corresponding to the to-be-tested image. Refer to process 606.

Figure 8:
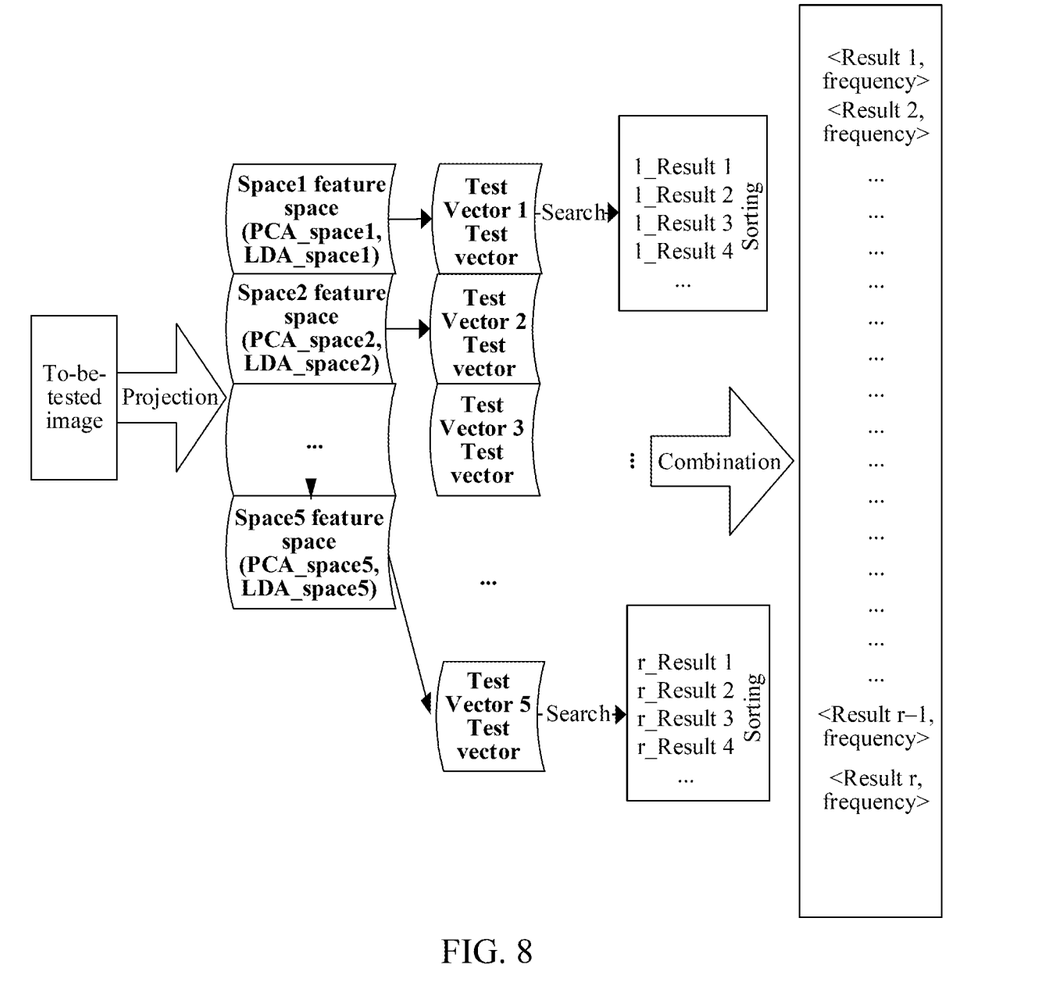
FIG. 8 is a schematic diagram of performing image recognition on a to-be-tested image according to an exemplary embodiment.

As shown in FIG. 8, assuming that there are computing nodes, and each computing node has a feature space (Space) thereof, there are 5 feature spaces in total, and each feature space is a data pair combining a 2DPCA feature space and a LDA feature space. Step 551 and step 552 are performed in each computing node, and a secondary test feature vector (that is, TestVector1, TestVector2 . . . TestVector5) of the to-be-tested image is obtained by calculation in each computing node.

In step 553, a similarity is calculated between the secondary test feature vector and a secondary feature vector of each image sample loaded on the computing node, to find by searching an image sample having a highest similarity.

The respective computing nodes are in parallel, and each computing node performs classification and recognition on the to-be-tested image by using a nearest neighbor classifier. Refer to process 607. Specifically, each computing node calculate a similarity between a secondary test feature vector (TestVectorN) of the to-be-tested image obtained by the computing node and a secondary feature vector (Ti) of each image sample loaded thereof, to find by searching an image sample having a highest similarity, that is, a local optimal solution.

The similarity calculation may be calculating a difference between two vectors (a secondary test feature vector and a secondary feature vector) according to a distance definition formula, and usually, uses an absolute distance as a measure. In this exemplary embodiment of the present disclosure, a Euclidean distance calculation formula and a cosine distance calculation formula may be used.

Step 553 specifically includes, for example, calculating a Euclidean between the secondary test feature vector and the secondary feature vector of each image sample loaded on the computing node, and using an image sample of which the Euclidean distance is the shortest as an image sample most similar to the to-be-tested image.

As shown in FIG. 8, 1_Result1, 1_Result2, 1_Result3 . . . represent that a first computing node sorts all image samples thereof in descending order according to a similarity between each image sample thereof and the to-be-tested image, and r_Result1, r_Result2, r_Result3 . . . represent that an $r^{th}$ computing node sorts all image samples thereof in descending order according to a similarity between each image sample thereof and the to-be-tested image, so that r image samples that each have a highest similarity and that are outputted by r computing nodes. Assuming that there are 5 computing nodes, 5 image samples each having a highest similarity to the to-be-tested image may be obtained.

Step 570 specifically includes, for example, sifting, from image samples that each have a highest similarity and that are found by searching by the respective computing nodes, an image sample having a highest occurrence frequency as a recognition result of the to-be-tested image.

That is, after r computing nodes complete calculation and obtain r local optimal solutions, in a reduce stage of a MapReduce framework, the r local optimal solutions (result1, result2, result3, . . . , result n, . . . , result r) are compared, and a total of r resultant data pairs can be obtained. Each resultant data pair is (result n, frequency), where frequency represents a number of times that result n appears in the r local optimal solutions. Specifically, a result X having a highest frequency may be selected as a recognition result of the to-be-tested image, that is, a global optimal solution.

Assuming that there are 5 computing nodes, there are 5 local optimal solutions in total. By comparing a number of times each local optimal solution appears with that of another local optimal solution, a local optimal solution that appears a largest number of times may be selected as a global optimal solution, and the obtained global optimal solution is a final recognition result of the to-be-tested image. Closest image samples are respectively found by searching from the respective nodes, then, a closest image sample is further found through searching from the search results of the respective nodes. Such a secondary searching method fully utilizes performance of a distributed computing framework, so that recognition efficiency is improved. In the related technology, even though a distributed computing framework is used, the distributed computing framework is used to perform global searching. In a case of massive sample data, compared with the secondary searching manner from local optimality to global optimality in the present disclosure, an existing image recognition manner consumes more time and has lower image recognition efficiency.

The following apparatus embodiments of the present disclosure may be configured to the image processing method for implementing image recognition performed by the foregoing server 110 of the present disclosure. For details not disclosed in the apparatus embodiments of the present disclosure, refer to the embodiments of the image processing method for implementing image recognition of the present disclosure.

Figure 9:
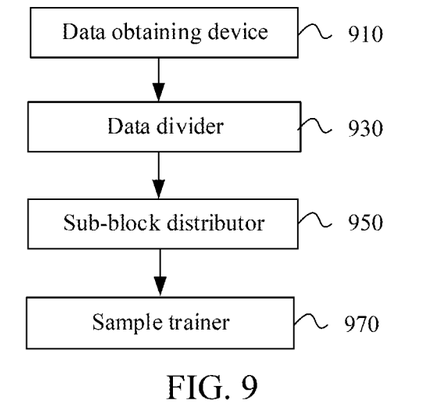
FIG. 9 is a block diagram of an image processing apparatus for implementing image recognition according to an exemplary embodiment.

FIG. 9 is a block diagram of an image processing apparatus for implementing image recognition according to an exemplary embodiment. The apparatus performs image processing by using a distributed computing framework. The image processing apparatus for implementing image recognition may be used in the server 110 of the implementation environment shown in FIG. 1 to perform all or some steps of the image processing method for implementing image recognition shown in any one of FIG. 3 to FIG. 5 and FIG. 7. As shown in FIG. 9, the apparatus includes, but is not limited to including: a data obtaining device 910, a data divider 930, a sub-block distributor 950, and a sample trainer 970.

The data obtaining device 910 is configured to obtain an image sample data set, the image sample data set including a plurality of image samples.

The data divider 930 is configured to divide the image sample data set according to a quantity of the image samples in the image sample data set and a quantity of computing nodes of the distributed computing framework, image samples divided into one group forming an image sample sub-block.

The sub-block distributor 950 is configured to distribute the image sample sub-blocks to the computing nodes.

The sample trainer 970 is configured to perform, through the respective computing nodes, image recognition sample training of the image sample sub-blocks loaded thereon, and obtain a training result corresponding to each image sample in the image sample sub-blocks on the respective computing nodes.

For details about implementation processes of functions and effects of respective devices in the apparatus, refer to implementation process of corresponding steps in the foregoing image processing method for implementing image recognition. Details are not described herein again.

The data obtaining device 910, for example, may be the input/output interface 258 of a specific physical structure in FIG. 2.

The data divider 930, the sub-block distributor 950, and the sample trainer 970 may alternatively be functional devices, and are configured to perform corresponding steps in the foregoing image processing method for implementing image recognition. It may be understood that the devices may be implemented as hardware, software, or a combination of the two. During implementation in a hardware manner, the devices may be implemented as one or more pieces of hardware, for example, one or more application-specific integrated circuits. During implementation in a software manner, the devices may be implemented as one or more computer programs executed on one or more processors, for example, a program that is executed by the central processing unit 222 in FIG. 2 and that is stored in the memory 232.

The sample trainer 970 is specifically configured to perform, through the respective computing nodes in parallel, image recognition sample training of the image sample sub-blocks loaded thereon, and obtain a training result corresponding to each image sample in the image sample sub-blocks on the respective computing nodes.

Figure 10:
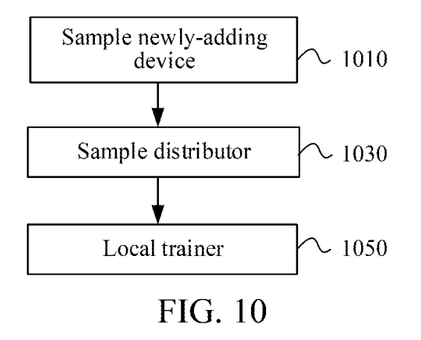
FIG. 10 is a block diagram of another exemplary image processing apparatus for implementing image recognition based on the embodiment corresponding to FIG. 9.

Based on the foregoing apparatus embodiments, as shown in FIG. 10, the apparatus may further include, but is not limited to including:
a sample newly-adding device 1010, configured to obtain a newly-added image sample;
a sample distributor 1030, configured to distribute the newly-added image sample to the computing node;
a local trainer 1050, configured to perform, by the computing node of the newly-added image sample, image recognition sample training again for the image samples loaded thereon, to obtain a new training result of each image sample loaded thereon.

In an exemplary embodiment, the sample distributor 1030 is configured to:
distribute, in a case that the quantity of the image samples of the image sample data set is N, and the quantity of the computing nodes is n, a newly-added $(N+a)^{th}$ sample image to an $((N+a) \% n)^{th}$ computing node.

Figure 11:
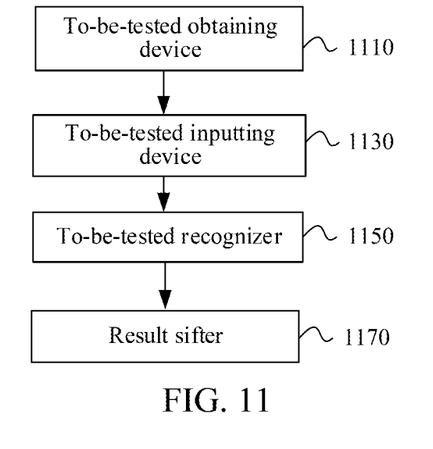
FIG. 11 is a block diagram of still another exemplary image processing apparatus for implementing image recognition based on the embodiment corresponding to FIG. 9.

Based on the foregoing apparatus embodiments, as shown in FIG. 11, the apparatus may further include, but is not limited to including:
a to-be-tested obtaining device 1110, configured to obtain a to-be-tested image;
a to-be-tested inputting device 1130, configured to input the to-be-tested image to the respective computing nodes of the distributed computing framework;
a to-be-tested recognizer 1150, configured to perform, through the respective computing nodes, recognition on the to-be-tested image according to the training results of the image samples loaded thereon, to obtain recognition results of the to-be-tested image on the respective computing nodes; and
a result sifter 1170, configured to sift the recognition results of the to-be-tested image on the respective computing nodes to obtain an image recognition result.

Based on the foregoing apparatus embodiments, the sample trainer 970 may include, but is not limited to including:
a primary trainer, configured to train, through each computing node, the image samples loaded thereon by using a two-dimensional principal component analysis algorithm to obtain a primary feature space of the computing node and a primary feature vector corresponding to each image sample in the computing node in the primary feature space; and
a secondary trainer, configured to use the primary feature vector as sample input of a linear discriminant analysis algorithm, and perform training to obtain a secondary feature space of the computing node and a secondary feature vector corresponding to each image sample in the computing node in the secondary feature space.

Figure 12:
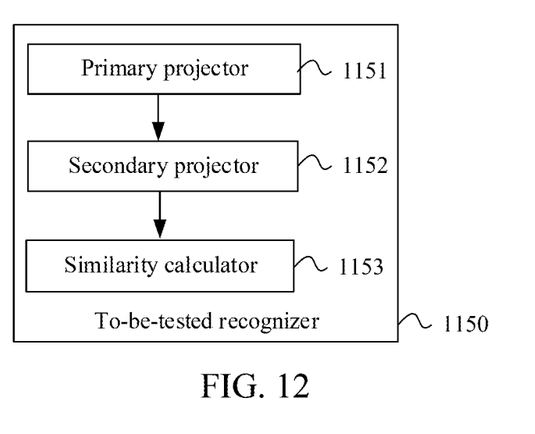
FIG. 12 is a detailed block diagram of an exemplary to-be-tested recognizer in the embodiment corresponding to FIG. 11.

Based on the foregoing apparatus embodiments, as shown in FIG. 12, the to-be-tested recognizer 1150 may include, but is not limited to including:
a primary projector 1151, configured to project, through each computing node, the to-be-tested image to a primary feature space of the computing node, to obtain a primary test feature vector corresponding to the to-be-tested image;
a secondary projector 1152, configured to project the primary test feature vector to a secondary feature space of the computing node, to obtain a secondary test feature vector corresponding to the to-be-tested image; and a similarity calculator 1153, configured to calculate a similarity between the secondary test feature vector and a secondary feature vector of each image sample loaded on the computing node, to find by searching an image sample having a highest similarity.

Optionally, the result sifter may include, but is not limited to including:

a similarity sifter, configured to sift, from image samples that each have a highest similarity and that are found by searching by the respective computing nodes, an image sample having a highest occurrence frequency as a recognition result of the to-be-tested image.

Optionally, the similarity calculator is specifically configured to:

calculate a Euclidean between the secondary test feature vector and the secondary feature vector of each image sample loaded on the computing node, and use an image sample of which the Euclidean distance is the shortest as an image sample most similar to the to-be-tested image.

Optionally, the present disclosure further provides an electronic device. The electronic device may be used in the server 110 of the implementation environment shown in FIG. 1 to perform all or some steps of the image processing method for implementing image recognition shown in any one of FIG. 3 to FIG. 5 and FIG. 7. The electronic device includes:

a processor; and a memory, configured to store instructions executable by the processor, the processor being configured to perform the image processing method for implementing image recognition according to the foregoing embodiments.

Specific manners in which the processor of the electronic device in this embodiment performs operations have been described in detail in the embodiments related to the image processing method for implementing image recognition. Details are not described herein.

In an exemplary embodiment, a storage medium (e.g., a non-transitory computer-readable storage medium) is further provided. The storage medium is a computer-readable storage medium, and may be, for example, temporary and non-temporary computer-readable storage mediums including instructions. The storage medium stores a computer program, and the computer program may be executed by a processor to perform the foregoing image processing method for implementing image recognition.

What is claimed is:

1. An image processing method for implementing image recognition using a distributed computing framework, the method comprising:
   obtaining, by processing circuitry of an image processing apparatus, an image sample data set, the image sample data set including a plurality of image samples;
   dividing, by the processing circuitry, the image sample data set into image sample sub-blocks according to a quantity of the image samples in the image sample data set and a quantity of computing nodes of the distributed computing framework; and
   distributing, by the processing circuitry, the image sample sub-blocks to the computing nodes, wherein
   each of the computing nodes performs image recognition sample training based on the one of the image sample sub-blocks distributed to the respective computing node and obtains a training result corresponding to each image sample in the one of the image sample sub-blocks.

2. The method according to claim 1, wherein the computing nodes perform the image recognition sample training and the obtaining in parallel.

3. The method according to claim 1, further comprising:
   obtaining, by the processing circuitry, a newly-added image sample; and
   distributing, by the processing circuitry, the newly-added image sample to one of the computing nodes that performs another image recognition sample training for the image samples distributed to the one of the computing nodes to obtain a new training result of each of the image samples distributed to the one of the computing nodes.

4. The method according to claim 3, wherein the distributing the newly-added image sample comprises:
   distributing, in a case that the quantity of the image samples of the image sample data set is N, and the quantity of the computing nodes is n, a newly-added $(N+a)^{th}$ sample image to an $((N+a) \% n)^{th}$ computing node of the computing nodes.

5. The method according to claim 1, further comprising:
   obtaining, by the processing circuitry, a to-be-tested image; and
   inputting, by the processing circuitry, the to-be-tested image to the computing nodes of the distributed computing framework, the computing nodes perform recognition on the to-be-tested image according to the training results of the image samples distributed to the respective computing nodes, to obtain recognition results of the to-be-tested image on the respective computing nodes; and
   determining, by the processing circuitry, an image recognition result based on the recognition results of the to-be-tested image on the respective computing nodes.

6. The method according to claim 5, wherein each of the computing nodes
   performs a first training according to a two-dimensional principal component analysis algorithm to obtain a primary feature space of the respective computing node and a primary feature vector corresponding to each image sample in the respective computing node in the primary feature space; and
   uses the primary feature vector as sample input of a linear discriminant analysis algorithm, and performs a second training to obtain a secondary feature space of the respective computing node and a secondary feature vector corresponding to each image sample in the respective computing node in the secondary feature space.

7. The method according to claim 6, wherein each of the computing nodes
   projects the to-be-tested image to the primary feature space of the respective computing node, to obtain a primary test feature vector corresponding to the to-be-tested image;
   projects the primary test feature vector to the secondary feature space of the respective computing node, to obtain a secondary test feature vector corresponding to the to-be-tested image; and
   calculates a similarity between the secondary test feature vector and the secondary feature vector of each image distributed to the respective computing node, to determine the image sample having a highest similarity.

8. The method according to claim 7, wherein the determining the image recognition result comprises:
   determining, from the image samples that each have a highest similarity as determined by the respective computing nodes, an image sample of the determined image samples having a highest occurrence frequency as a recognition result of the to-be-tested image.

9. The method according to claim 7, wherein
a Euclidean distance is calculated between the secondary test feature vector and the secondary feature vector of each image sample distributed to the respective computing node, and
the image sample of which the Euclidean distance is the shortest is determined as the image sample most similar to the to-be-tested image.

10. An image processing apparatus for implementing image recognition using a distributed computing framework, the apparatus comprising:
processing circuitry configured to
obtain an image sample data set, the image sample data set including a plurality of image samples;
dividing the image sample data set into image sample sub-blocks according to a quantity of the image samples in the image sample data set and a quantity of computing nodes of the distributed computing framework; and
distributing the image sample sub-blocks to the computing nodes, wherein
each of the computing nodes performs image recognition sample training based on the one of the image sample sub-blocks distributed to the respective computing node and obtains a training result corresponding to each image sample in the one of the image sample sub-blocks.

11. The apparatus according to claim 10, wherein the computing nodes perform the image recognition sample training and the obtaining in parallel.

12. The apparatus according to claim 10, wherein the processing circuitry is configured to
obtain a newly-added image sample; and
distribute the newly-added image sample to one of the computing nodes that performs another image recognition sample training for the image samples distributed to the one of the computing nodes to obtain a new training result of each of the image samples distributed to the one of the computing nodes.

13. The apparatus according to claim 12, wherein the processing circuitry is configured to:
distribute, in a case that the quantity of the image samples of the image sample data set is N, and the quantity of the computing nodes is n, a newly-added $(N+a)^{th}$ sample image to an $((N+a) \% n)^{th}$ computing node of the computing nodes.

14. The apparatus according to claim 10, wherein the processing circuitry is configured to
obtain a to-be-tested image;
input the to-be-tested image to the computing nodes of the distributed computing framework, the computing nodes perform recognition on the to-be-tested image according to the training results of the image samples distributed to the respective computing nodes, to obtain recognition results of the to-be-tested image on the respective computing nodes; and
determine an image recognition result based on the recognition results of the to-be-tested image on the respective computing nodes.

15. The apparatus according to claim 14, wherein each of the computing nodes
performs a first training according to a two-dimensional principal component analysis algorithm to obtain a primary feature space of the respective computing node and a primary feature vector corresponding to each image sample in the respective computing node in the primary feature space; and
uses the primary feature vector as sample input of a linear discriminant analysis algorithm, and performs a second training to obtain a secondary feature space of the respective computing node and a secondary feature vector corresponding to each image sample in the respective computing node in the secondary feature space.

16. The apparatus according to claim 15, wherein each of the computing nodes
projects the to-be-tested image to the primary feature space of the respective computing node, to obtain a primary test feature vector corresponding to the to-be-tested image;
projects the primary test feature vector to the secondary feature space of the respective computing node, to obtain a secondary test feature vector corresponding to the to-be-tested image; and
calculates a similarity between the secondary test feature vector and the secondary feature vector of each image sample distributed to the respective computing node, to determine the image sample having a highest similarity.

17. The apparatus according to claim 16, wherein the processing circuitry is configured to
determine, from the image samples that each have a highest similarity as determined by the respective computing nodes, an image sample of the determined image samples having a highest occurrence frequency as a recognition result of the to-be-tested image.

18. The apparatus according to claim 16, wherein
a Euclidean distance is calculated between the secondary test feature vector and the secondary feature vector of each image distributed to the respective computing node, and
the image sample of which the Euclidean distance is the shortest is determined as the image sample most similar to the to-be-tested image.

19. A non-transitory computer-readable storage medium storing instructions which when executed by a processor cause the processor to perform:
obtaining an image sample data set, the image sample data set including a plurality of image samples;
dividing the image sample data set into image sample sub-blocks according to a quantity of the image samples in the image sample data set and a quantity of computing nodes of a distributed computing framework; and
distributing the image sample sub-blocks to the computing nodes, wherein
each of the computing nodes performs image recognition sample training based on the one of the image sample sub-blocks distributed to the respective computing node and obtains a training result corresponding to each image sample in the one of the image sample sub-blocks.

20. The non-transitory computer-readable storage medium according to claim 19, wherein the computing nodes perform the image recognition sample training and the obtaining in parallel.

* * * * *